(12) United States Patent
Rose et al.

(10) Patent No.: US 7,313,514 B2
(45) Date of Patent: Dec. 25, 2007

(54) VALIDATING CONTENT OF LOCALIZATION DATA FILES

(75) Inventors: Daniel A. Rose, Markham (CA); Baldev S. Soor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 10/671,383

(22) Filed: Sep. 25, 2003

(65) Prior Publication Data
US 2004/0064807 A1    Apr. 1, 2004

(30) Foreign Application Priority Data
Sep. 30, 2002    (CA)    .................................... 2406025

(51) Int. Cl.
*G06F 17/20* (2006.01)
*G06F 9/44* (2006.01)
(52) U.S. Cl. .......................................... 704/8; 717/124
(58) Field of Classification Search .................... None
See application file for complete search history.

(56) References Cited

U.S. PATENT DOCUMENTS

| | | | | |
|---|---|---|---|---|
| 4,215,406 | A | 7/1980 | Gomola et al. ................ | 700/95 |
| 5,416,903 | A | 5/1995 | Malcolm et al. ............. | 395/156 |
| 5,564,050 | A | 10/1996 | Barber et al. .................... | 707/4 |
| 5,583,761 | A | 12/1996 | Chou et al. .................. | 715/536 |
| 5,812,122 | A * | 9/1998 | Ng .............................. | 715/703 |
| 5,892,905 | A | 4/1999 | Brandt et al. ................ | 713/201 |
| 5,974,253 | A | 10/1999 | Nahaboo et al. ............. | 717/105 |
| 6,009,517 | A | 12/1999 | Bak et al. .................... | 712/245 |
| 6,219,632 | B1 * | 4/2001 | Schumacher et al. .......... | 704/2 |
| 6,453,462 | B1 * | 9/2002 | Meade et al. ................ | 717/124 |
| 2003/0079051 | A1 * | 4/2003 | Moses et al. ................ | 709/328 |
| 2003/0084401 | A1 * | 5/2003 | Abel et al. ................ | 715/501.1 |

* cited by examiner

*Primary Examiner*—David Hudspeth
*Assistant Examiner*—Samuel G Neway
(74) *Attorney, Agent, or Firm*—Duke W. Yee; Marilyn Smith Dawkins; Peter B. Manzo

(57) ABSTRACT

The invention provides for extracting language and culture information from a POSIX™* conforming locale source file for the purpose of formatting sample data for country and language expert validation. The invention is performed on a computer system by obtaining a locale source file, in a preferred form, containing a plurality of elements having language and culture information, extracting and then using those elements and their associated values cooperatively with sample data, to generate readable text representations, thereby providing a country and language expert reviewer with textual data formatted according to the conventions embodied in the locale source file.

The invention provides representative results without requiring compilation of a locale object, thereby increasing the dfliciency of validation efforts.
ISO/IEC 9945-1:1900 (IEEE Standard 1003.2-1990) Information Technology-Portable Operating System Interface (POSIX™) Shell Utilities, IEEE Standards 1003.2 and 1003.2a.

20 Claims, 5 Drawing Sheets

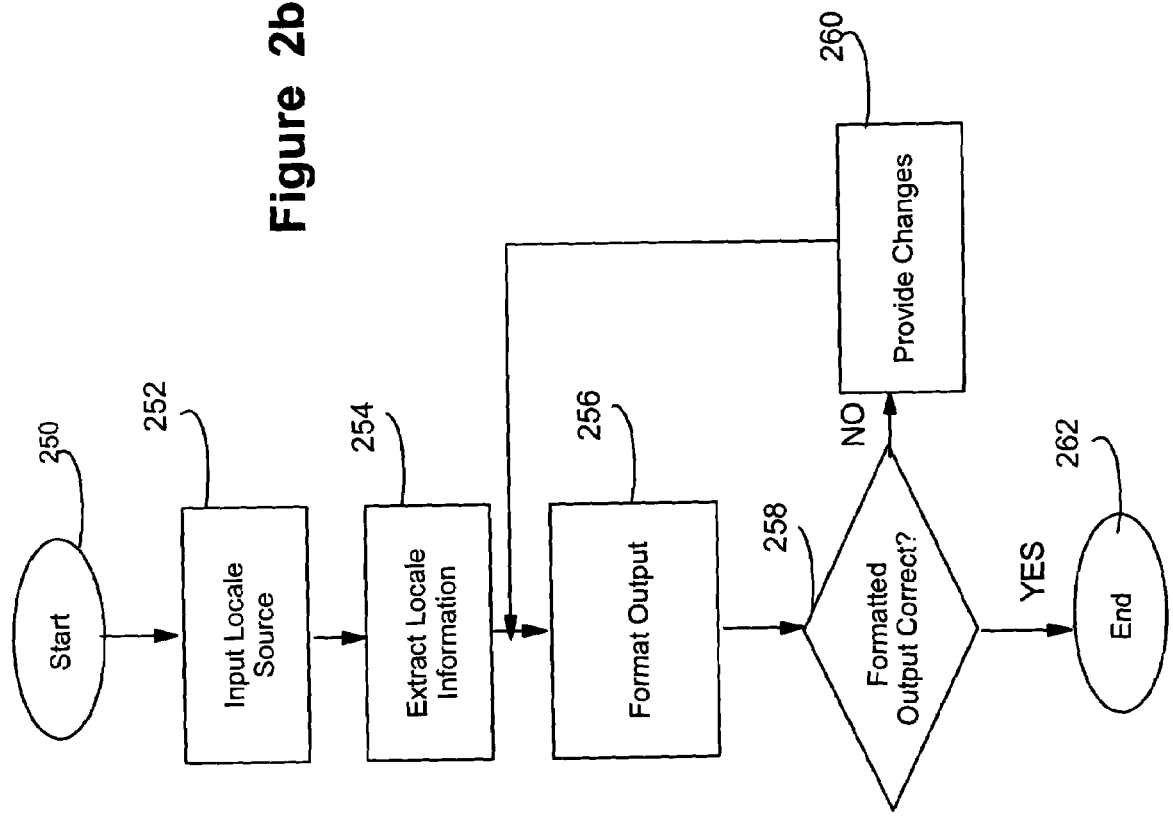

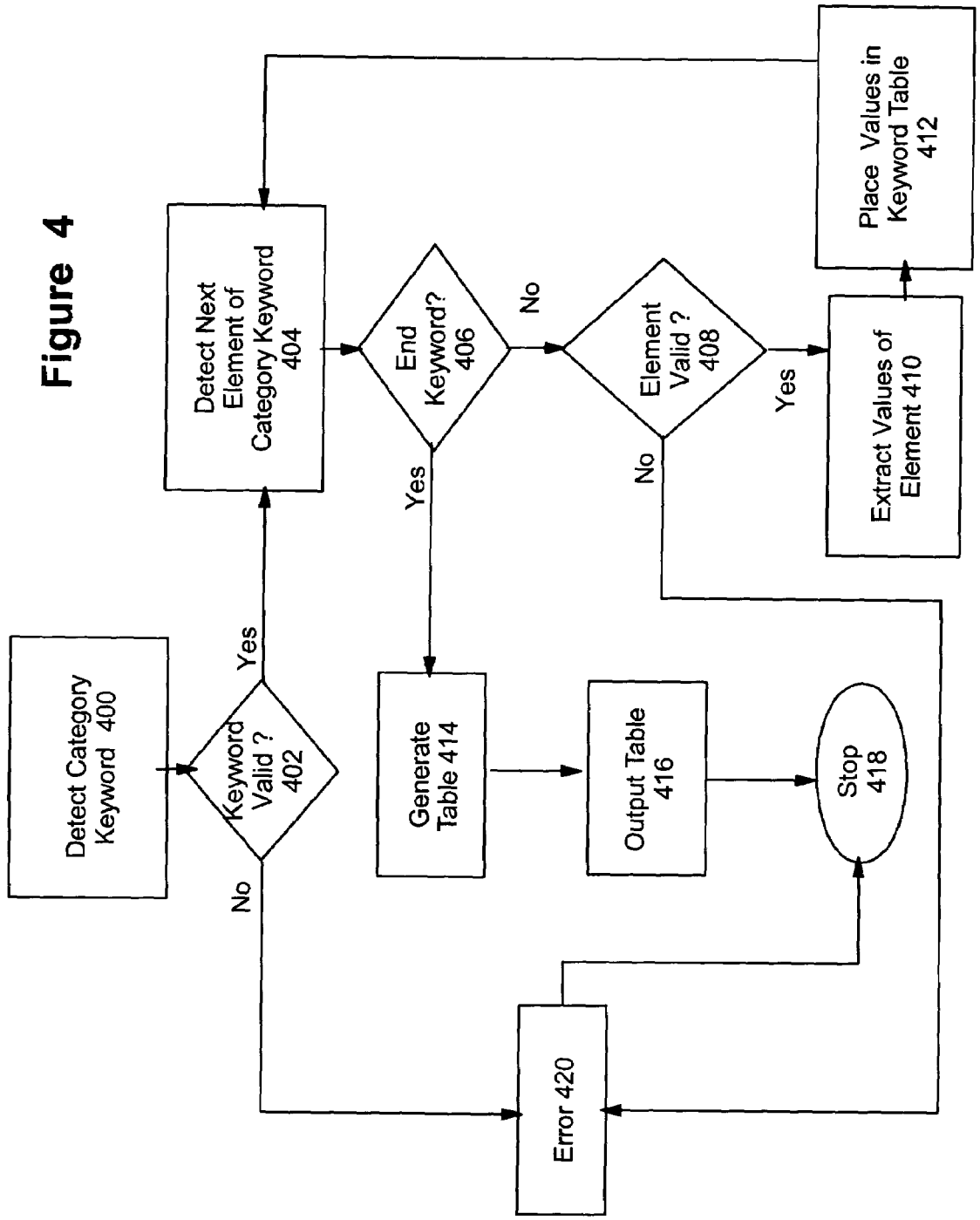

VALIDATING CONTENT OF LOCALIZATION DATA FILES

FIELD OF THE INVENTION

This invention relates to the use of computer systems and methods to validate specifications consisting of language and cultural details in a source file, and more specifically to validating such specifications contained in a source file through formatting data using extracted language and cultural details contained in the file.

BACKGROUND OF THE PRESENT INVENTION

In the computer software marketing and distribution industry, it is advantageous to make software available for use which reflects the language and culture of the intended users. A locale file is typically made available by a developer of a software application to assist in accomplishing this. A locale file includes a combination of specifications or settings required to configure a software application program for a particular geographic and cultural market. These specifications typically include a language specification intended to be used to control and determine linguistic manipulation of character strings within the application program. In addition specifications for countries, regions and territories (collectively referred to herein as "country") define cultural conventions that vary with languages, cultures or across countries. An example of a cultural convention is a date format identifying in which order the numerals representing day, month and year appear. Other configuration preferences, such as those used to specify mail settings or favorite icons are known in the art, but are typically not included in locale files. Ensuring accurate computer application program processing of information according to local cultural and geographical preferences relies on correct specifications provided in a locale file for a given language and country. In order to ensure the accuracy of specifications which are to be referenced by program applications, it is desirable to have validation performed on the individual localization specifications incorporated in a locale file. Accuracy is expected by users when an application program uses the content of a locale file for formatting data for presentation to users.

Current practice includes the conversion of a locale source file containing the localization specifications, by a utility program (such as localedef as defined in standard ISO/IEC 9945-1:1900 (Institute of Electrical and Electronics Engineers (IEEE) Standard 1003.2-1990) *Information Technology-Portable Operating System Interface (POSIX™) Shell Utilities*, IEEE Standards 1003.2 and 1003.2a) and suitable compiler (such as one for the C programming language) from an editable text file form into a locale file object form referred to herein as "locale object", for use by application programs. If the formatted output of the application program resulting from using the locale object, is subsequently found to be not correct, there is typically a problem with the locale object and its associated locale source file information. The locale source file must be corrected with appropriate required changes, recompiled and validated again. Visual inspection of the results of the output of the application program resulting from using the locale object may be used or the results may be programmatically compared with reference values if known. It will be appreciated that this iterative process can require a significant amount of time and effort to obtain the desired results.

The current practice of updating the locale source file, recompiling and re-testing has been found to be error prone. Changes to the locale source file may often introduce new errors, not related to language or culture, into the compilation stage.

The validation process often involves the use of a different environment than where the locale object is intended to be used, for example, performing the validation on a workstation platform for a locale object intended to be used on a mainframe. In such cases, the locale object and related programming interfaces of the mainframe platform cannot be used directly during validation on the workstation platform.

SUMMARY OF THE PRESENT INVENTION

The present invention provides for improved methods, programs and computer system for validating locale files which overcome the difficulties and shortcomings of the presently known practice. The present invention provides for retrieval of language and culture specifications intended for use with application programs from a locale source file and validating those specifications through testing data formatted using those specifications. The present invention obviates the need for compilation of the locale source file.

In one aspect of the present invention, there is provided a method implemented on a computer system for validating the contents of a locale source file comprising information arranged by categories, keywords and elements. The method comprising, detecting one or more of each of the categories, keywords and elements in the locale source file and extracting one or more elements from the locale source file. The extracted element is stored as textual data in an element storage area, and a text string of data is then formatted from the textual data. Validation is performed on the formatted text string.

In another aspect of the invention, there is provided an article for use on a computer for validating the contents of a locale source file comprising information arranged by categories, keywords and elements. The article comprises a computer readable signal bearing medium, having computer readable instructions to perform method steps of detecting one or more of each of the categories, keywords and elements in the locale source file. Additionally, the instructions provide for steps to extract one or more elements from the locale source file, storing the extracted element as textual data in an element storage area, formatting a text string of data from the textual data and validating the text string of data.

In a further aspect of the invention, there is provided a computer system for validating the language and country information contained in a locale source file, the computer system comprising means for detecting one or more of each of the categories, keywords and elements in the locale source file. Additionally, means for extracting one or more elements from the locale source file, means for storing the extracted element as textual data in an element storage area, means for formatting a text string of data from the textual data and means for validating the text string of data.

Other features and advantages of the present invention should be apparent from the following description of the preferred embodiment, which illustrates, by way of example, the principles of the invention.

BRIEF DESCRIPTION OF THE DRAWINGS

The following figures, illustrate by way of examples, the implementation of embodiments of the present invention, in which:

FIG. 2b is a flow diagram illustrating a process implemented by the components shown in FIG. 2a;

FIG. 4 is a flow diagram illustrating the category keyword process shown in FIG. 3.

DETAILED DESCRIPTION OF PREFERRED EMBODIMENTS

Figure 1:
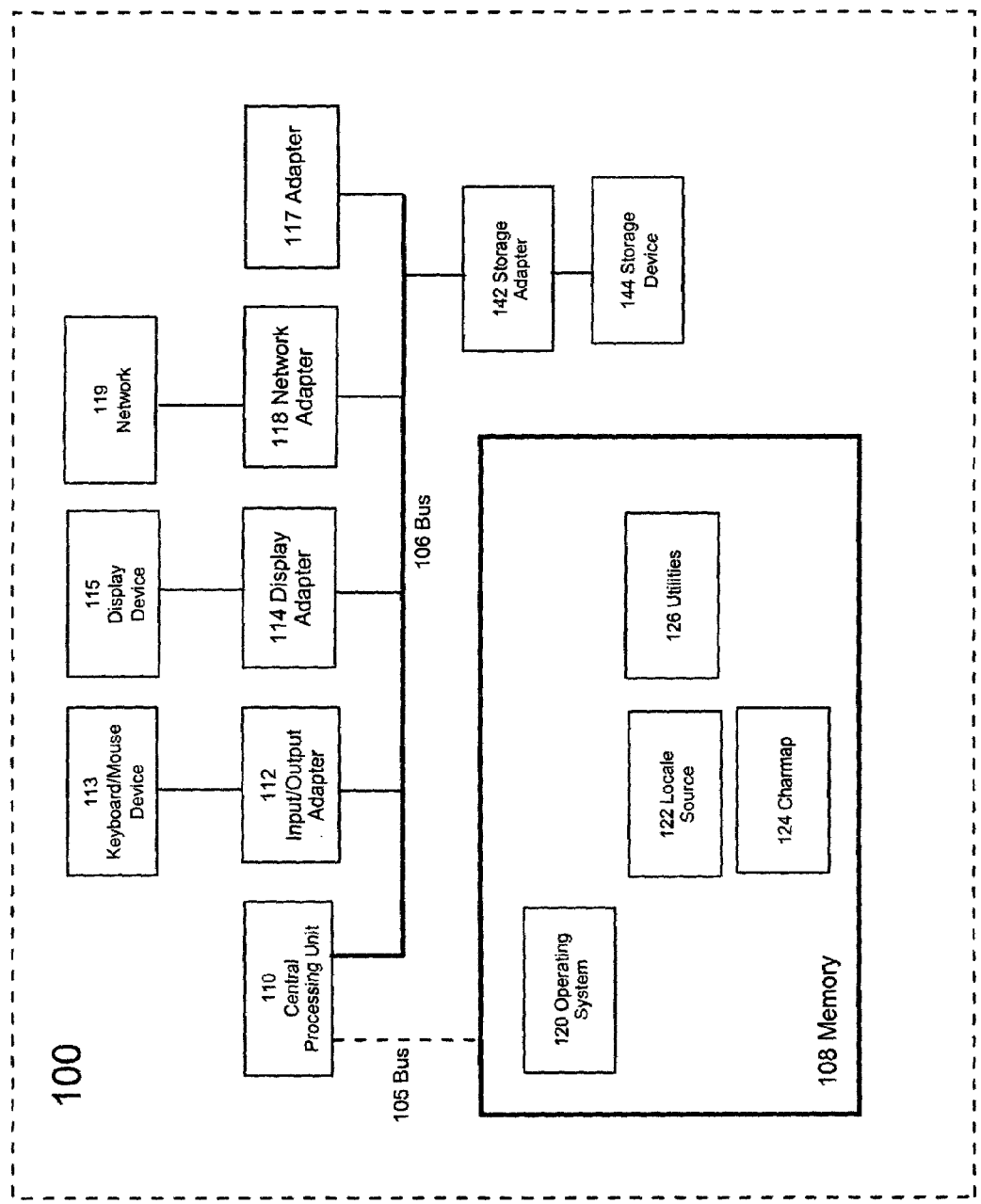
FIG. 1 illustrates an example of a computer system for implementing embodiments of the invention.

FIG. 1 depicts, in a simplified block diagram, a computer system 100 suitable for implementing embodiments of the present invention. Computer system 100 has a central processing unit (CPU) 110, which is a programmable processor for executing programmed instructions, such as instructions contained in utilities (utility programs) 126 stored in memory 108. Memory 108 can also include hard disk, tape or other storage media. While a single CPU is depicted in FIG. 1, it is understood that other forms of computer systems can be used to implement the invention, including multiple CPUs. It is also appreciated that the present invention can be implemented in a distributed computing environment having a plurality of computers communicating via a suitable network 119, such as the Internet.

CPU 110 is connected to memory 108 either through a dedicated system bus 105 and/or a general system bus 106. Memory 108 can be a random access semiconductor memory for storing language and culture data for each country and culture such as locale source file 122 and optionally an associated charmap file (language character set file) 124. Charmap 124 provides a binding of the abstract symbolic character entries used in locale source file 122 with the underlying concrete technology supported by computer system 100. Memory 108 is depicted conceptually as a single monolithic entity but it is well known that memory 108 can be arranged in a hierarchy of caches and other memory devices. FIG. 1 illustrates that operating system 120, locale source file 122, charmap (language character set files) 124 and utilities 126, may reside in memory 108.

Operating system 120 provides functions such as device interfaces, memory management, multiple task management, and the like as known in the art. CPU 110 can be suitably programmed to read, load, and execute instructions of operating system 120 and instructions of utilities 126. Computer system 100 has the necessary subsystems and functional components to implement testing of locale files as will be discussed later. Other programs (not shown) include server software applications in which network adapter 118 interacts with the server software application to enable computer system 100 to function as a network server via network 119.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology. The Input/output adapter 112 supports devices suited for input and output, such as keyboard or mouse device 113, and a disk drive unit (not shown). Storage adapter 142 supports one or more data storage devices 144, which could include a magnetic hard disk drive or CD-ROM drive although other types of data storage devices can be used, including removable media.

Adapter 117 is used for operationally connecting many types of peripheral computing devices to computer system 100 via bus 106, such as printers, bus adatpers, other computers using one or more protocols including Token Ring, LAN connections, as known in the art. Network adapter 118 provides a physical interface to a suitable network 119, such as the Internet. Network adapter 118 includes a modem that can be connected to a telephone line for accessing network 119. Computer system 100 can be connected to another network server via a local area network using an appropriate network protocol and the network server that can in turn be connected to the Internet. FIG. 1 is intended as an exemplary representation of computer system 100 by which embodiments of the present invention can be implemented. It is understood that in other computer systems, many variations in system configuration are possible in addition to those mentioned here.

Figure 2A:
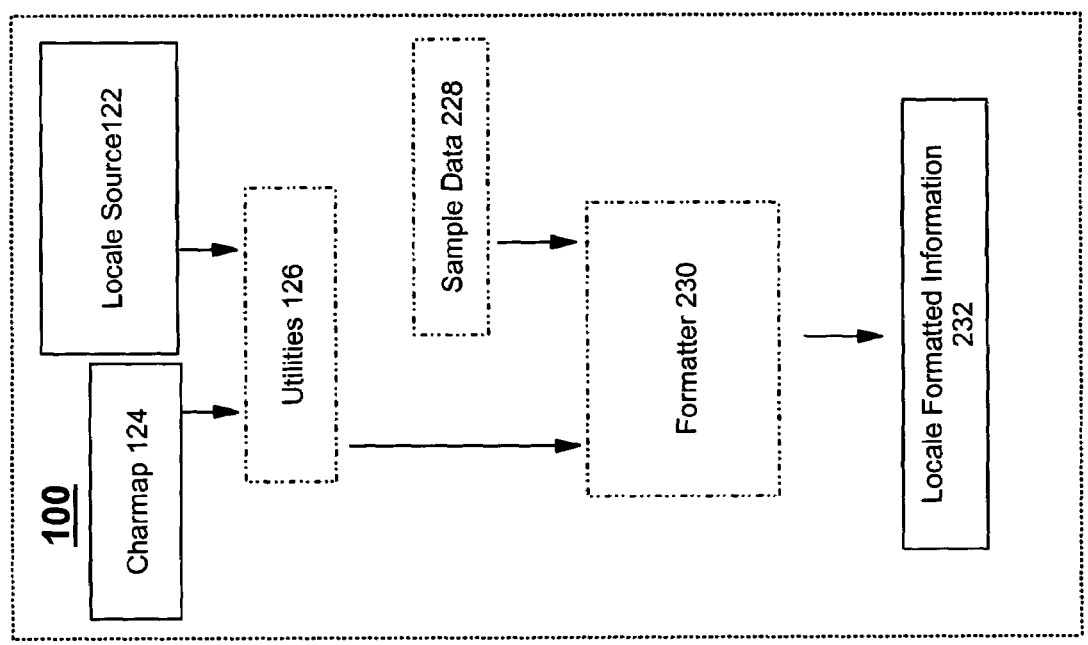
FIG. 2a illustrates more detailed components of the system shown in FIG. 1 for validating contents of a locale file.

FIG. 2a illustrates aspects of a simplified embodiment of the invention. Within computer system 100, locale source file 122 and charmap file 124 are provided as input to and processed by utilities 126 (one of a set of utility programs referenced as 126 in FIG. 1). The utility program 126, in this case, is an intelligent extractor, capable of extracting various details from the locale source file 122. Locale source file 122 is a structured file including categories which define sections of specifications such as time and date specifications. Within each category are keywords further segmenting category specifications and finally elements associated with the respective keywords as a most granular level of extracted details. An element may be composed of one or more values. An example is provided illustrating the contents of a category which will be subsequently described in association with Example A. The extracted information is made available to formatter 230 along with sample data 228. Sample data 228 is a collection of character strings, skeletons or templates to which is added extracted locale source file data to be processed by formatter 230 in conjunction with the extracted locale file specifications from locale source file 122. Formatter 230 uses the extracted information to format the sample data 228 into text strings, of locale formatted information 232, for testing. Testing involves examination of the resulting text strings of locale formatted information 232 for language and cultural correctness. Testing or validating may be undertaken by programmatic means or in some cases may also involve visual inspection.

Referring now to FIG. 2b, there is depicted a flow diagram of a process of an embodiment of aspects of the invention. The process begins with start 250 wherein the setup for the validation process is performed making the necessary data and input files available to be processed in the system, and on completion, passes control to operation 252.

Locale source file 122 and charmap (language character set file) 124 previously referred to in association with the subsystem of FIG. 2a, are obtained from memory and provided as input to the extraction step that follows in operation 254. The various elements of the locale source file 122 are then extracted in operation 254 to be used later in operation 256.

Working with the extracted output from operation 254, operation of formatter 256 generates the formatted readable text strings using the sample data 228, as previously described as part of FIG. 2a, and makes the locale formatted information available for use in operation 258.

The text strings from formatter operation 256 are tested during operation 258 to determine string validity with respect to the specific language and culture specifications. If the review during operation 258 was satisfactory, the validation process goes to completion ending at operation 262. If the results obtained during operation 258 are not in accordance with the actual language and cultural specifications, then the extracted locale source information requires correction and the process goes to operation 260. For example, a resultant formatted string of "Sunday is abbreviated as dim" when compared with the desired specification "Sun" would cause an error to be raised. Error notification may be as simple as recognizing a visual difference or it may involve an error message being issued during programmatic testing. The correct value "Sun" would be required in place of "dim".

During operation 260, locale information changes are provided by testers or knowledgeable users involved with the validation and applied to the extracted information, previously obtained during operation 254, making updated extracted information available for formatting again, starting with operation 256. This process is continued until the formatted output is correctly validated.

Figure 3:
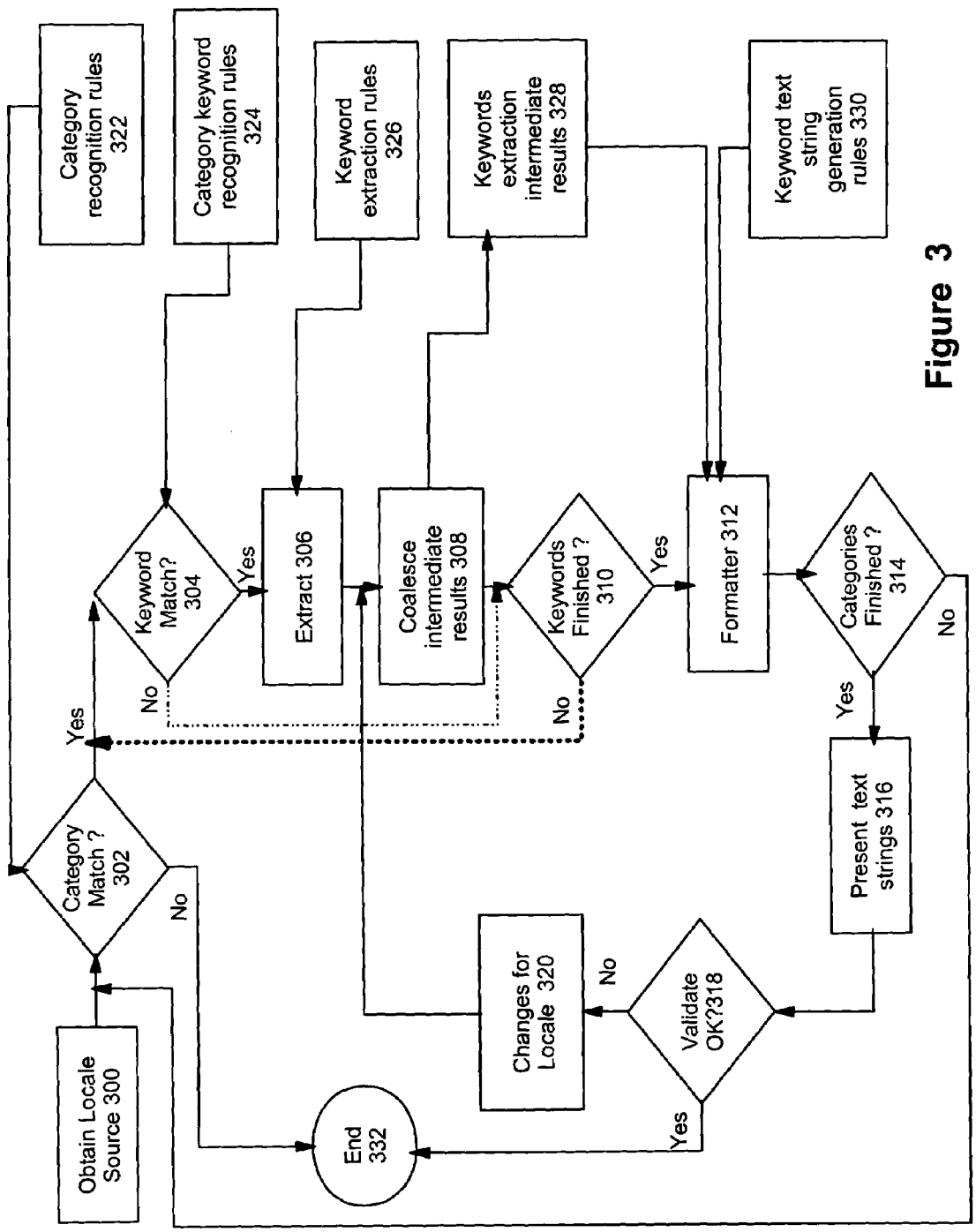
FIG. 3 is a flow diagram illustrating more detailed processes performed within the process shown in FIG. 2b.

FIG. 3, illustrates a flow diagram of an overall process for a preferred embodiment of the invention. The process is performed on a computer system storing the locale source file, using an extractor and making use of appropriate associated rules, patterns and substitution information (including logic and knowledge of how to interpret a locale source file), temporary data of the intermediate output of the extractor and final results of the process (text strings for testing). The set of keyboard rules, patterns and substitutions are referred to as keyword directives.

A sample portion of a locale source file conforming to POSIX locale source conventions, is depicted in Example A, a description of which follows. POSIX Locale Source Convention is ISO/IEC 9945-1:1900 (IEEE Standard 1003.2-1990) *Information Technology-Portable Operating System Interface (POSIX™) Shell Utilities*, IEEE Standards 1003.2 and 1003.2a. The following example of a local source file is used to illustrate an application of the invention.

EXAMPLE A

A POSIX locale source file, is a structured file containing tags and values, is typically comprised of data in one or more categories including time, monetary, numeric, collation, character classification, and yes/no response. The locale source file portion, depicted in Example A, is the time category specification in which the POSIX defined locale category tag LC_TIME, is used to identify the beginning of the time category specification and a corresponding category end tag END LC_TIME, is used to identify the ending of the time category specification. Between the LC_TIME and END LC_TIME tags is a series of category keywords and associated elements that identifies an attribute of the category specification, which in the case shown, identifies the abbreviated names of the week days. The order of the category keywords is not important.

The category keyword abday represents a collection of elements, each of which is comprised of associated values, associated with the abbreviated names of week days. The series of values in each element is composed of quoted character strings, separated by semicolons, continuing from entry to entry using the backslash character to designate each entry as shown in the Example A. The last value in the series has neither a comma nor a backslash.

The validation process, presumes any necessary setup has been performed to make required data ready for processing, begins at operation 300 in FIG. 3.

During operation 300, locale source file 122, as previously described and referred to and in POSIX format, is obtained and placed into memory for processing.

Locale source file 122 is examined for proper form and content by searching within the file for expected category identifiers during operation 302. The information in the input source file is compared with category recognition rules obtained from location 322. These rules include requirements for category identifiers including, category identifier patterns (e.g. category start and end identifiers). Referring to Example A, an example of a category start identifier of the category recognition rules 322 is shown as LC_TIME.

```
for English_in_Canada:
en_CA locale entries for "abday" in LC_TIME    Example output for the weekday abbreviations
LC_TIME                                         For English_in_Canada, the order and abbreviations
                                                for the weekdays are:
...
abday "<S><u><n>";\                             Sunday is abbreviated as Sun
      "<M><o><n>";\                             Monday is abbreviated as Mon
      "<T><u><e>";\                             Tuesday is abbreviated as Tue
      "<W><e><d>";\                             Wednesday is abbreviated as Wed
      "<T><h><u>";\                             Thursday is abbreviated as Thu
      "<F><r><i>";\                             Friday is abbreviated as Fri
      "<S><a><t>";\                             Saturday is abbreviated as Sat
...
END LC_TIME
For French_in_Canada:
fr_CA locale entries for "abday" in LC_TIME    Example output for the weekday abbreviations
LC_TIME                                         For French_in_Canada, the order and abbreviations for
                                                the weekdays are:
abday "<d><i><m>";\                             Sunday is abbreviated as dim
      "<l><u><n>";\                             Monday is abbreviated as lun
      "<m><a><r>";\                             Tuesday is abbreviated as mar
      "<m><e><r>";\                             Wednesday is abbreviated as mer
      "<j><e><u>";\                             Thursday is abbreviated as jeu
      "<v><e><n>";\                             Friday is abbreviated as ven
      "<s><a><m>";\                             Saturday is abbreviated as sam
...
END LC_TIME
```

If a category match is found during operation 302, processing continues to operation 304. If a proper match on the category identifier cannot be made during operation 302, the processing flows to operation 332 where the process ends.

During operation 304 the keyword within the respective category identified through a successful category match in operation 302 is processed. Keyword processing incorporates information obtained from category specific information obtained from location 324 in a manner similar to that which was previously described using information obtained from category information rules 322.

Category specific information 324 contains category keyword recognition rules regarding known keywords. Keywords are patterns of characters that are to be matched in the locale source file to aid in keyword processing. Category keywords must be found in order to enable extraction of associated values to occur. A sample keyword abday, from the LC_TIME category, is shown in Example A of the locale source file.

If a keyword match is found, validation processing continues to the extractor stage at operation 306. When a proper match on the keyword identifier cannot be made, the process flows to operation 310 instead, to determine if keyword processing has been completed for the respective category.

During extracting operation 306, keyword element information extraction begins, keyword by keyword. During operation 306, the keyword specific element information rules, patterns and substitution values are read in from keyword extraction rules 326 and used to process the plurality of keywords associated with a respective locale category. These rules, patterns and values (collectively referred to as keyword directives) enable and direct the extractor to "walk" through the locale source file data picking out pertinent details while ignoring other data. For each matched keyword the extraction process takes the associated element information from the locale source and performs a series of operations removing extraneous information (for example, string and value delimiters), then collecting previously separated element information into strings (for example, for a weekday element, individual characters are combined to form a day of the week name), performing substitutions (for example, a numeric value replaced with a character) as required. For example, the character string "<S><u><n>";\ the first element from abday keyword in Example A, would be reduced to "Sun". Upon completion of the extraction process for each element of a related keyword, the process moves to operation 308 to coalesce intermediate (previously collected) results.

During operation 308, keyword related element information is coalesced or gathered into a logical unit of information, making it ready for further processing. These logical units of information, such as a collection of abbreviated weekday names related to keyword abday, are placed into a memory location keyword extraction intermediate results 328 and processing moves to operation 310. For example, the keyword abday in Example A, could produce, in one embodiment, a comma separated values vector format beginning with the keyword abday, followed by elements, each containing the three letter value representations of the seven days of the week just extracted. The format would be "abday: SUN, MON, TUE . . . "

During operation 310, a check is made for more category keywords. When all keywords within the category have been processed the process proceeds to operation 312 otherwise the process is directed to operation 304 to begin the keyword match process again, within the current category.

During operation 312 sample data is formatted using the intermediate results of operation 308 stored in keywords extraction intermediate results location 328 according to rules, patterns and substitution values contained in keyword text string generation rules 330. The rules, patterns and substitution values enable formatter 312 to build output strings for testing. For example, if "Sun" was one of the abbreviated days of the week stored in location 328, formatter 312 would produce an output string such as "Sunday is abbreviated as Sun", depicted in the "Example output for the weekday abbreviations" of Example A in the previous example of the locale source file. The example just described involves selecting the appropriate string for output ("Sunday is abbreviated as" and combining it with an appropriate extracted intermediate result ("SUN") by placing it at a predetermined location within the string.

Operations involving more complex examples of patterns than what has been described above would occur, for example, when dealing with monetary string formatting wherein a predetermined pattern sequence of currency symbol, group and decimal separators would be used. The content of keyword extraction intermediate results 328 is iterated through by formatter 312 until the content has been exhausted, wherein processing moves to operation 314, to determine if processing has been performed for all detected categories. The output of formatter 312 can be held temporarily in an output buffer or other memory location (not shown) until all processed information is available.

Upon completion of processing information from keyword extraction intermediate results storage 328, a determination is made during operation 314 as to whether the processing of categories has completed. When processing of all detected categories is complete, processing moves to operation 316, otherwise processing moves to operation 302 and the locale source file 122 in memory is examined for more categories. Upon completion of the category processing, operation 316 is commenced.

During operation 316 all previously prepared information resulting from operation 312 is presented as output in the form of plain text strings. The output may be directed to a display, file or printer.

During operation 318, the output from operation 316 is tested for correctness. Testing may be performed programmatically against a desired output or reference set, or may be performed visually by a suitable operator. Testing may be performed by simple character based comparator operations in which the output just produced is compared with the content of a reference set. The reference set may be composed of character strings containing the desired form and content. Visual comparison incorporates the desired output using either prior knowledge of the operator or visual cues contained in a fact sheet supplied by the test administrator. In any event, when no errors are found, processing moves to completion, ending at operation 332. If errors are found, error corrections are provided during operation 320. These error corrections may be provided by a programmatic means by identifying differences in the output string from a reference set or manually by the operator in the case of visual checking.

During operation 320 the corrections supplied as outputs of operation 318 are provided as input to operation 308, where the corrections are applied to the intermediate results, and processing continues from that point.

Referring to FIG. 4, there are depicted operations 304 determining keyword match, 306 extracting keyword and 308 gathering intermediate results, using information provided in 324 category keyword recognition rules and 326 keyword extraction rules of FIG. 3 to be described in greater detail. Having obtained and placed into memory the locale source file (122 of FIG. 1) and located a valid category identifier within the locale source file through category match operation 302 of FIG. 3, processing is ready to commence with category keyword detection operation 400.

During detect category keyword operation 400, a currently identified category segment of the locale source file in memory is scanned, for category keywords. Finding a category keyword, processing moves to determination of valid keyword operation 402.

During keyword valid determination operation 402, verification is performed on an obtained keyword entry, using information from category keyword recognition rules 324 described previously in association with FIG. 3. If the keyword is not a valid keyword, processing moves to operation 420 as a detected error, otherwise the entry is a valid keyword and processing moves to operation 404 where a first or next element of the category keyword is detected.

During operation 404, elements associated with the category keyword are detected. Upon finding an element, processing moves to operation 406 where it is determined if the element found is an end keyword. If the element found is an end keyword, all elements associated with the current keyword are presumed to have been processed and processing moves to generate table operation 414. If the element found is not an end keyword, processing moves to operation 408 to determine if the detected element is valid. Element validation operation 408 and operation 410 to extract values of elements using keyword extraction rules or directives 326 of FIG. 3. If the element is not a valid element, processing moves to operation 420 as a detected error. Otherwise processing moves to operation 410 where the valid element is extracted. Upon extraction of the valid element during operation 410 processing moves to operation 412 where the previously extracted element values are moved into an element storage area containing a category structure of intermediate results to be subsequently used in table generating operation 414. For example a category structure may be a tabular form containing a row per keyword, with its associated keyword element values contained within respective cells of that row. A row may further contain a cell containing a label in the form of category and keyword identifiers for easy reference. When operation 412 is completed, processing is moved to operation 404 again, looking for more elements of the category keyword to process. If an end keyword (such as "END LC_TIME" shown in Example A previous) is found, processing moves to operation 414 during which a table containing sample data strings (such as "Sunday is abbreviated as") and the relevant keyword associated data values (again with reference to Example A, for the extracted keyword "abday", the first element contains values "SUN") extracted from the keyword elements is generated. If an end keyword is not detected processing continues as described before.

Upon generating the table in operation 414, processing moves to operation 416 where the table is output to a device, such printer, storage or display, causing processing to end at operation 418.

The preferred embodiment just described processes a locale source file through processing steps to detect categories, keyword of categories and elements of keywords contained in the locale source file. Finally an extraction steps strips out pertinent values from the detected elements which are used for formatting sample text strings. These formatted strings are then tested for correctness. The described processes do not require the creation of a locale object and the formatted strings are in plain text for easy testing and viewing by the program developer or end user of the program.

It has been shown that the invention reduces the number of steps previously required to perform the locale source file specification validation thereby reducing required resources. Maintaining the extracted locale source specification in textual format also facilitates, in most cases, easier maintenance of applications when compared to that of a locale object file as is presently done.

The concepts of the present invention can be further extended to a variety of other applications that are considered to be within the scope of this invention. Having thus described the present invention with respect to a preferred embodiment, it will be apparent, to those of ordinary skill in the art, that many modifications and enhancements are possible to the present invention without departing from the basic concepts as described in the preferred embodiment of the present invention. Therefore, what is intended to be protected by way of letters patent should be limited only by the scope of the following claims.

The embodiments of the invention in which an exclusive property or privilege is claimed are defined as follows:

1. A method implemented on a computer system for validating a content of a locale source file, said method comprising:
   inputting said locale source file that includes language and cultural data, wherein said language and cultural data are arranged by categories, keywords and elements in said locale source file;
   detecting one or more of each said categories, keywords and elements in said locale source file;
   extracting one or more of said elements with associated values from said locale source file;
   storing each of said extracted elements as textual data in an element storage area;
   formatting a text string of data using said textual data;
   comparing said text string of data with a reference string to validate said content of said locale source file for language and cultural correctness, wherein said reference string includes character strings containing a desired form and content of said locale source file;
   determining when said text string of data differs from said reference string:
   providing an associated change for said text string of data when indicated by said determining step; and
   applying said associated change to said textual data to automatically correct language and cultural errors in said locale source file.

2. The method of claim 1, wherein each said element further comprises at least one value.

3. The method of claim 2 wherein the steps of extracting one or more of said elements and storing each said extracted element comprises:
   labeling each said element storage area with a storage identifier;
   obtaining a set of keyword directives; and
   extracting each said keyword, and each said element and associated value within said keyword from said categories into said element storage area in accordance with said set of keyword directives.

4. The method of claim 3 wherein, said storage area identifier further comprises:
   a locale source file category identifier and associated keyword identifier.

5. The method of claim 3 wherein the step of formatting a text string of data comprises:

obtaining said textual data from said element storage area;
obtaining a set of text generation rules, patterns and substitution information; and
formatting said text string of data, using said textual data, element by element, by applying said set of text generation rules, patterns and substitution information to each said text string of data.

6. The method of claim 5, further comprising;
displaying one or more of said text string of data to users.

7. The method of claim 1 wherein said locale source file is a POSIX form.

8. An article comprising a data storage medium embodying a program of machine readable instructions executable by an electronic processing apparatus to perform method steps for validating a content of a locale source file, said method steps comprising the steps of:
inputting said locale source file that includes language and cultural data, wherein said language and cultural data are arranged by categories, keywords and elements in said locale source file;
detecting one or more of each of said categories, keywords and elements in said locale source file;
extracting one or more of said elements from said locale source file;
storing said extracted elements as textual data in an element storage area;
formatting a text string of data from said textual data;
comparing said text string of data with a reference string to validate said content of said locale source file for language and cultural correctness, wherein said reference string includes character strings containing a desired form and content of said locale source file;
determining when said text string of data differs from said reference string;
providing an associated change for said text string of data when indicated by said determining step; and
applying said associated change to said textual data to automatically correct language and cultural errors in said locale source file.

9. The article of claim 8, wherein the instructions for extracting and storing element steps further embody instructions to perform steps comprising:
labeling each said element storage area with a storage identifier;
obtaining a set of keyword directives; and
extracting each said keyword, and each said element and associated value within said keyword from each said categories into said element storage area in accordance with said set of keyword directives.

10. The article of claim 9 wherein the instructions for performing the labeling step further embody instructions to perform steps comprising:
identifying each said element storage area by said storage area identifier composed of a locale source file category identifier and an associated keyword identifier.

11. The article of claim 10 wherein instructions for formatting a text string of data step further embody instructions to perform steps comprising:
obtaining said textual data from said element storage area;
obtaining a set of text generation rules, patterns and substitution information; and
formatting said text string of data, element by element, using said textual data, and applying said set of text generation rules, patterns and substitution information to each said text string of data.

12. The article of claim 11, further embodying instructions to perform steps comprising;
displaying one or more of said text string of data users.

13. The article of claim 8 wherein said locale source file is a POSIX form.

14. A computer system for validating a content of a locale source file, said computer system comprising:
means for inputting said locale source file that includes language and cultural data, wherein said language and cultural data are arranged by categories, keywords and elements in said locale source file;
means for detecting one or more of each of said categories, keywords and elements in said locale source file;
means for extracting one or more of said elements with associated values from said locale source file;
means for storing said extracted element as textual data in an element storage area;
means for formatting a text string of data from said textual data;
means for comparing said text string of data with a reference string to validate said content of said locale source file for language and cultural correctness, wherein said reference string includes character strings containing a desired form and content of said locale source file;
means for determining when said text string of data differs from said reference string;
means for providing an associated change for said text string of data when indicated by said determining step; and
means for applying said associated change to said textual data to automatically correct language and cultural errors in said locale source file.

15. The computer system of claim 14 wherein said means for extracting one or more element and for storing said extracted element comprises:
means for labeling each said element storage area with a storage identifier;
means for obtaining a set of keyword directives; and
means for extracting each said keyword, and each said element and associated value within said keyword, from said categories into said element storage area in accordance with said set of keyword directives.

16. The computer system of claim 15 further comprising;
means for identifying said element storage area by a storage area identifier composed of a locale source file category identifier and an associated keyword identifier.

17. The computer system of claim 14 wherein said means for formatting a text string of data comprises:
means for obtaining said textual data from said element storage area;
means for obtaining a set of text generation rules, patterns and substitution information;
means for formatting said text string of data, using said textual data, element by element, applying said set of text generation rules, patterns and substitution information to each said text string of data.

18. The computer system of claim 14 further comprising;
means for configuring said system to operate in a distributed computing environment.

19. The computer system of claim 14 wherein the locale source file is a POSIX form.

20. The computer system of claim 14 further comprising means for configuring said system to display one or more text string of data to users.

* * * * *